US006226846B1

(12) United States Patent
Watson

(10) Patent No.: US 6,226,846 B1
(45) Date of Patent: May 8, 2001

(54) PUSHER TOOL

(76) Inventor: Mark Watson, 16205 Case Rd., Rochester, WA (US) 98579

( * ) Notice: Subject to any disclaimer, the term of this patent is extended or adjusted under 35 U.S.C. 154(b) by 0 days.

(21) Appl. No.: 09/164,828

(22) Filed: Oct. 1, 1998

Related U.S. Application Data

(63) Continuation of application No. 08/147,403, filed on Nov. 5, 1993, now abandoned.

(51) Int. Cl.[7] ..................................................... B23P 19/04
(52) U.S. Cl. ............................................................... 29/252
(58) Field of Search .............................. 29/252, 270, 271, 29/272, 275, 278, 280, 281.1, 281.5, 426.5

(56) References Cited

U.S. PATENT DOCUMENTS 1,292,498 * 1/1919 Malone .................................. 29/252
5,163,210 * 11/1992 Lostra .................................... 29/252

* cited by examiner

*Primary Examiner*—Lee Young
*Assistant Examiner*—Marc W. Butler
(74) *Attorney, Agent, or Firm*—Thomas W. Secrest

(57) ABSTRACT

This invention is directed to a pusher tool for pushing a member out of passageway. In particular, the pusher tool is for pushing a grease cup in the passageway of a yoke in a universal joint. Wherein the grease cup for holding grease and bearings becomes frozen in the passageway in the yoke, it may be very difficult to remove the grease cup from the passageway. A housing can be attached to the yoke. In the housing, there is a plunger which can be moved in the passageway in the yoke. Grease is applied to the interior of the housing and the back of the plunger for moving the plunger against the grease cup. Sufficient pressure can be exerted on the grease to force the grease cup out of the passageway in the yoke.

20 Claims, 7 Drawing Sheets

PUSHER TOOL

This application is a division of application Ser. No. 08/147,403 filed Nov. 5, 1993, abandoned Jun. 9, 1999.

THE BACKGROUND OF THE INVENTION

In equipment, there is often a passageway in a housing. This passageway can receive a member. One of the pieces of equipment which has a housing with a passageway for receiving a member is the yoke of a universal joint.

Universal joints are used in many forms of machinery such as farm equipment, tractors, automobiles, pickups and trucks, earth moving equipment and construction equipment.

The universal joint comprises a yoke which has two spaced-apart arms for receiving ends of a cross or ends of a cross member. In each of the spaced-apart arms, there is a passageway. In this passageway, there is positioned a cup which surrounds the end of the cross or the cross member. The cup houses bearings and is for receiving grease. There are two yokes in a universal joint.

Such equipment is most of the time used in the open or out-of-doors. An example is a truck or a crawler tractor. A truck such as a heavy-duty dump truck and a crawler tractor are often exposed to the elements such as dust, dirt, water, snow, mud, heat, chemicals on the road and the like. As a result, extraneous material becomes lodged between the passageway in the passageway of the yoke and the cup for receiving part of the cross of the universal joint. In time, the cup and the yoke tend to fuse together or bond together.

It is often necessary to separate the cross of the universal joint form the yoke. In those instances where there has been extraneous material deposited between the cup and the yoke, it is often difficult to remove the cup from the passageway in the yoke. For small universal joints, the removal of the cup can be done with a hammer or a pounding instrument and a rod. The cup can be pounded out of the passageway or forced out of the passageway.

For larger universal joints, it can be very difficult to remove the cup from the passageway in the yoke. I have seen people pound on the cup with a hammer or a sledgehammer and literally have spent hours trying to remove the cup from the passageway in the yoke. Again, the cup and the yoke have tended to fuse together because of the extraneous materials which have settled between the cup and the yoke and the chemical reaction between the cup and the yoke.

To the best of my knowledge and information, there is no readily available piece of equipment for pushing or forcing the cup out of the passageway in the yoke. The repair man must use a hammer or sledgehammer or other available equipment to pound on the cup to force it out of the passageway into the yoke.

Because of having worked with repairing universal joints and having to face the problem of removing the cup from the yoke before a new universal joint can be positioned in the yoke, I have developed this pusher tool.

THE GENERAL DESCRIPTION OF THE INVENTION

This invention is essentially a pusher tool for pushing the cup out of the passageway in a yoke.

The tool comprises a means for attachment to the arm of the yoke. Then, a plunger is moved in the passageway in the yoke. This plunger contacts the cup of the universal joint which is in the passageway in the yoke. With sufficient pressure, the plunger is moved in the passageway in the yoke and forces the cup out of the passageway in the yoke.

The time and effort required for pushing the cup out of the passageway is a short time and a minimum of effort.

The fluid for moving the cup out of the passageway is grease. A grease gun can be attached to the pusher tool and sufficient pressure exerted by the grease gun to force the cup out of the passageway. The grease may be manually sent to the pusher tool or there may be a mechanical grease gun such as a pneumatic grease gun for sending the grease to the pusher tool.

THE OBJECTS AND THE ADVANTAGES

The main object and advantage of this invention is to provide a pusher tool which is capable of pushing a member out of a passageway;

- Another object and advantage is to provide a small, compact pusher tool which can be easily carried to push a member out of a passageway;
- Another object and advantage is to provide a relatively inexpensive pusher tool;
- Another object and advantage is to provide such a pusher tool which can be manually activated or machine activated;
- Another object and advantage is to provide such a pusher tool which can push a grease cup out of a passageway in the yoke of a universal joint apparatus;
- Another object and advantage is to have such a pusher tool which is readily installable and positionable on a yoke on a universal joint apparatus;
- Another object and advantage is to have such a pusher tool which requires relatively little instruction to learn to use; and,
- Another object and advantage is the provision of said pusher tool which may require only an inexpensive grease gun assembly to supply the grease under pressure;

These and other objects and advantages will be more fully brought forth upon reading and reviewing the subject matter of this invention.

THE DRAWINGS

In the drawings, it is seen that:

Figure 6:
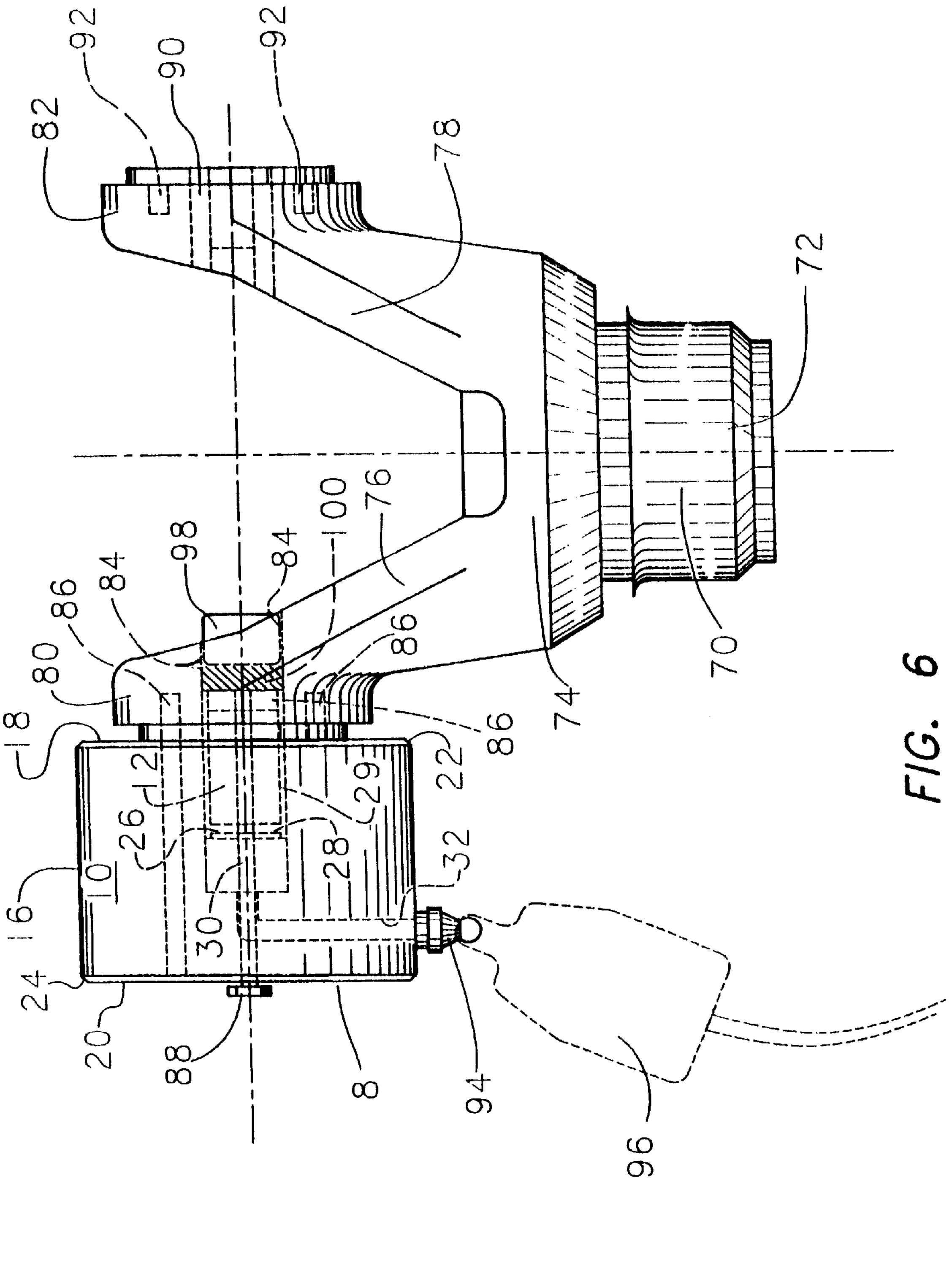
Figure 7:
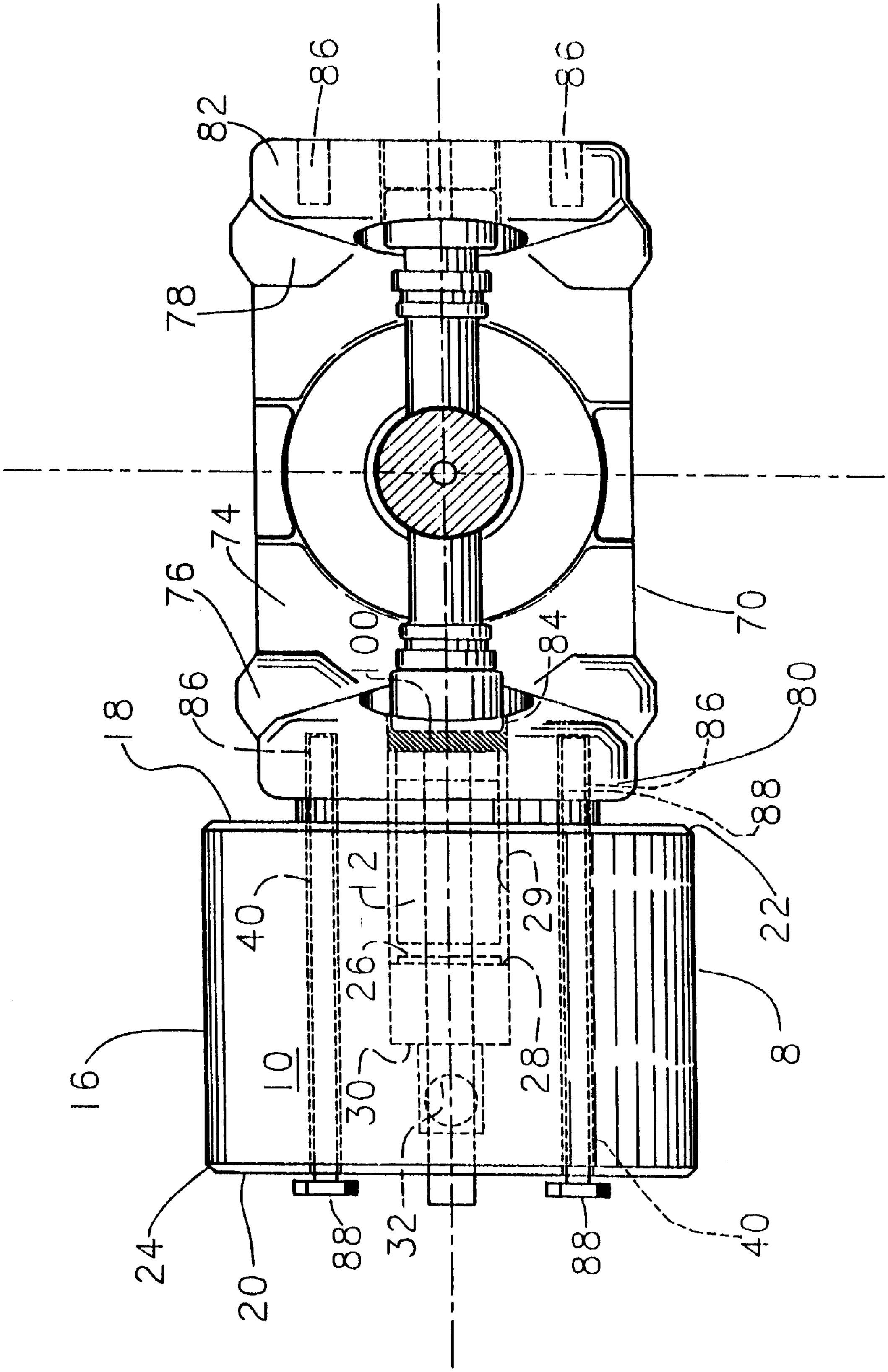

FIG. 6 is a side elevational view of the yoke of a universal joint apparatus and shows the two spaced-apart arms of the yoke and also illustrates the pusher tool as attached to one of the arms and illustrates in phantom the passageways in the pusher tool and the plunger for forcing a grease cup out of the passageway in one arm of the yoke of the universal joint; and, FIG. 7 is a top plan view illustrating the yoke of the universal joint, the two spaced-apart arms of the universal joint and the pusher tool attached to one arm of the universal joint by phantom lines in the universal joint, and in the housing the plunger pushing against the cup in the passageway in one arm of the yoke and with part of the cup pushed out of the passageway in said arm of the yoke.

THE SPECIFIC DESCRIPTION OF THE INVENTION

Figure 1:
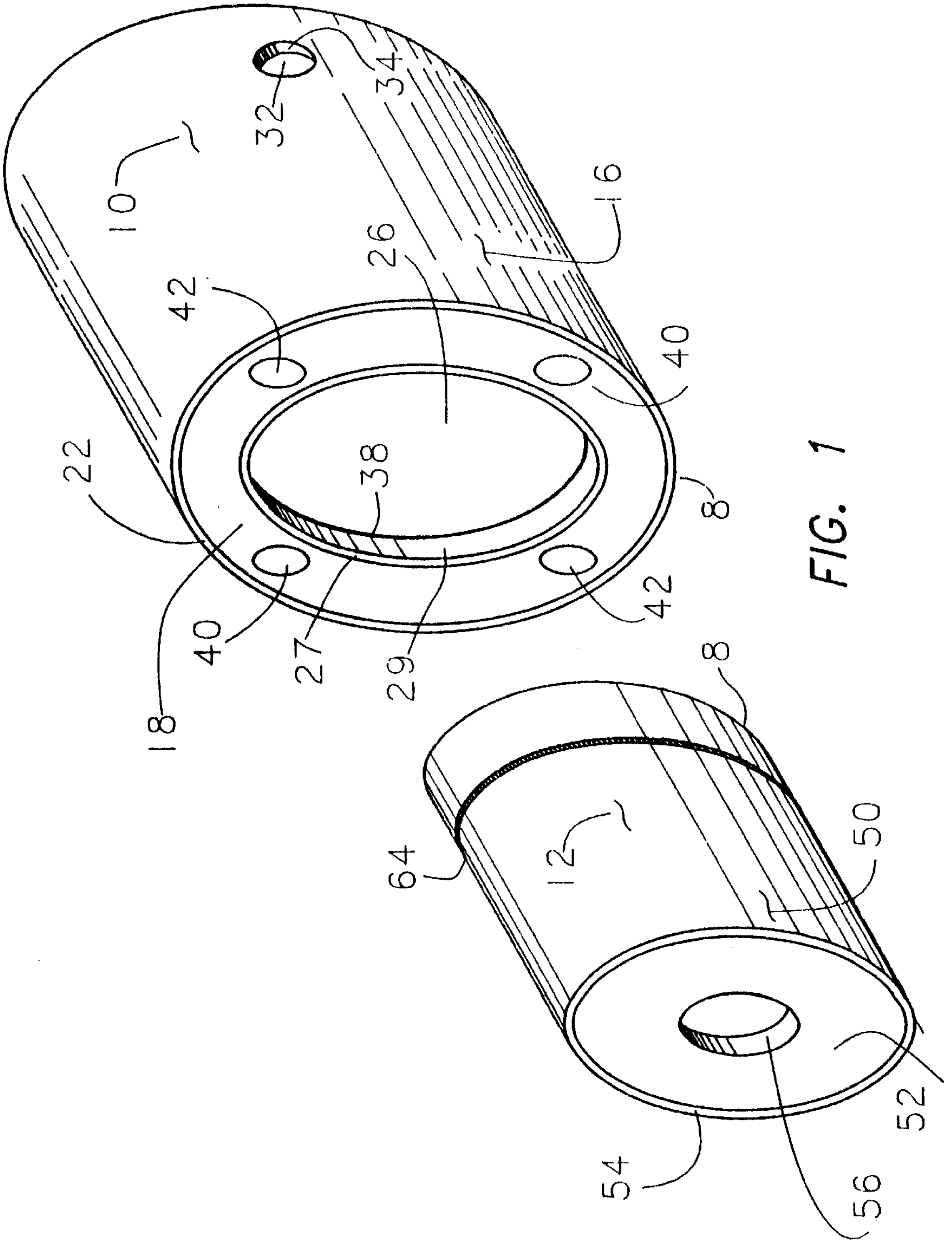
FIG. 1 is a perspective view of the invention illustrating the housing and plunger separated from each other and also illustrating the housing as having a recess for receiving the plunger.

In FIG. 1, it is seen that there is a pusher tool 8 having a housing 10 and a plunger 12. The housing 10 is of a generally right cylindrical configuration having an exterior surface 16.

In FIG. 1, the end closer to the viewer has an open end surface 18.

Figure 2:
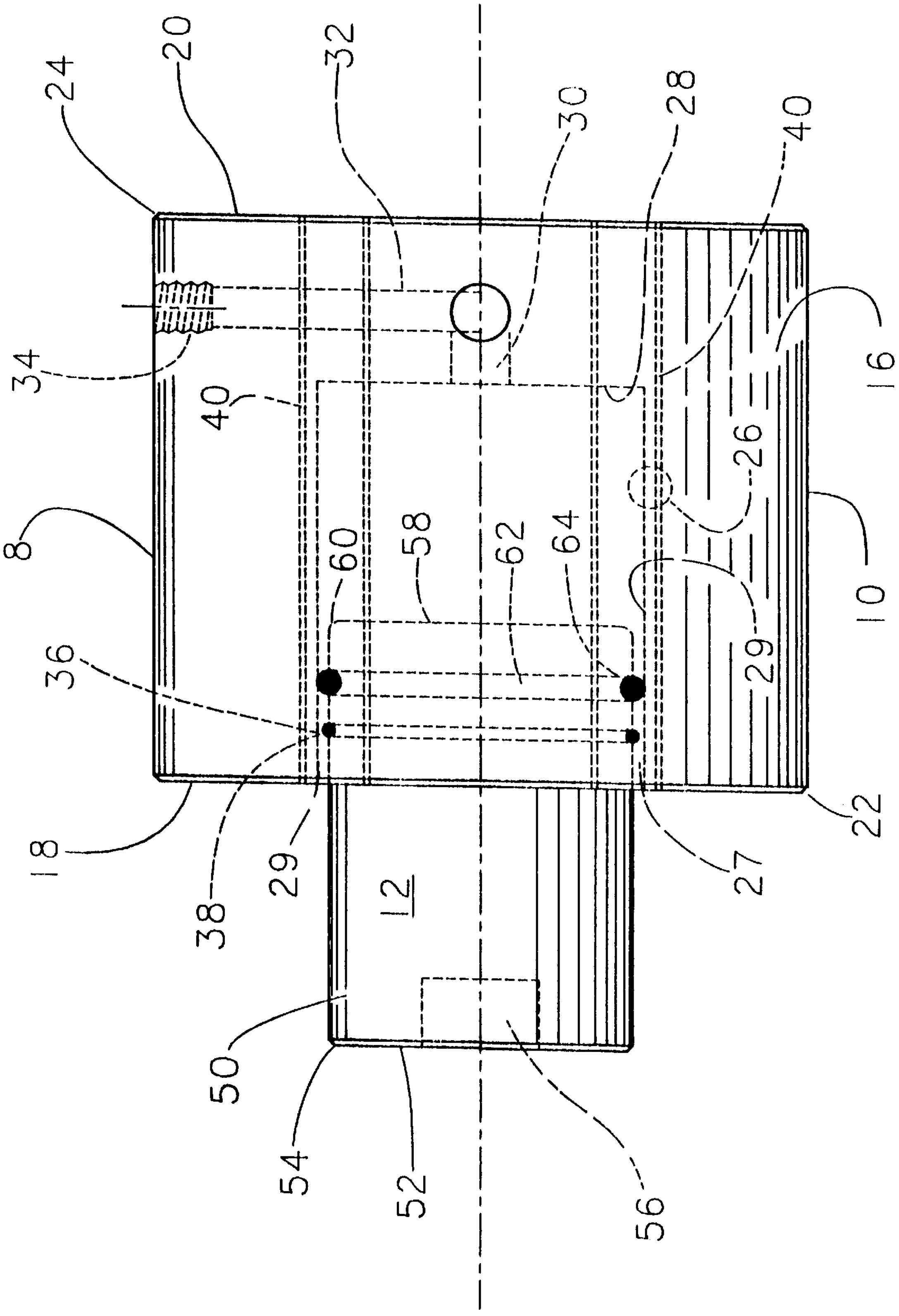
FIG. 2 is a side elevational view of the pusher tool illustrating the housing with the plunger partially in the housing or the plunger partially extended from the housing and also with phantom lines illustrating the inner passageways for the flow of grease into the housing and the plunger in the housing.
Figure 3:
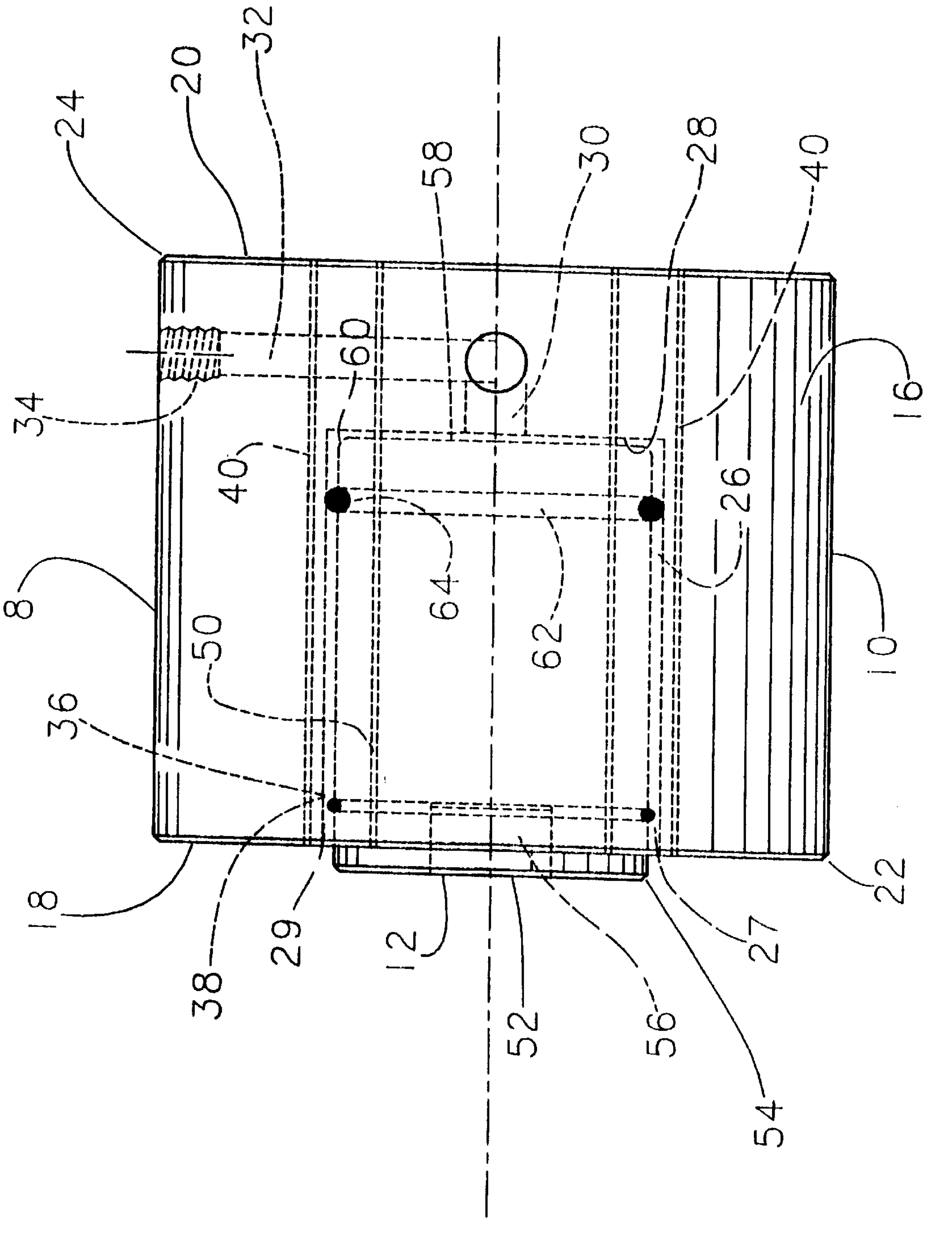
FIG. 3 is a side elevational view of the combination of a housing and the plunger with the plunger retracted in the housing and also illustrates in phantom line passageways for receiving bolts for attaching the housing to the yoke of a universal joint apparatus.
Figure 4:
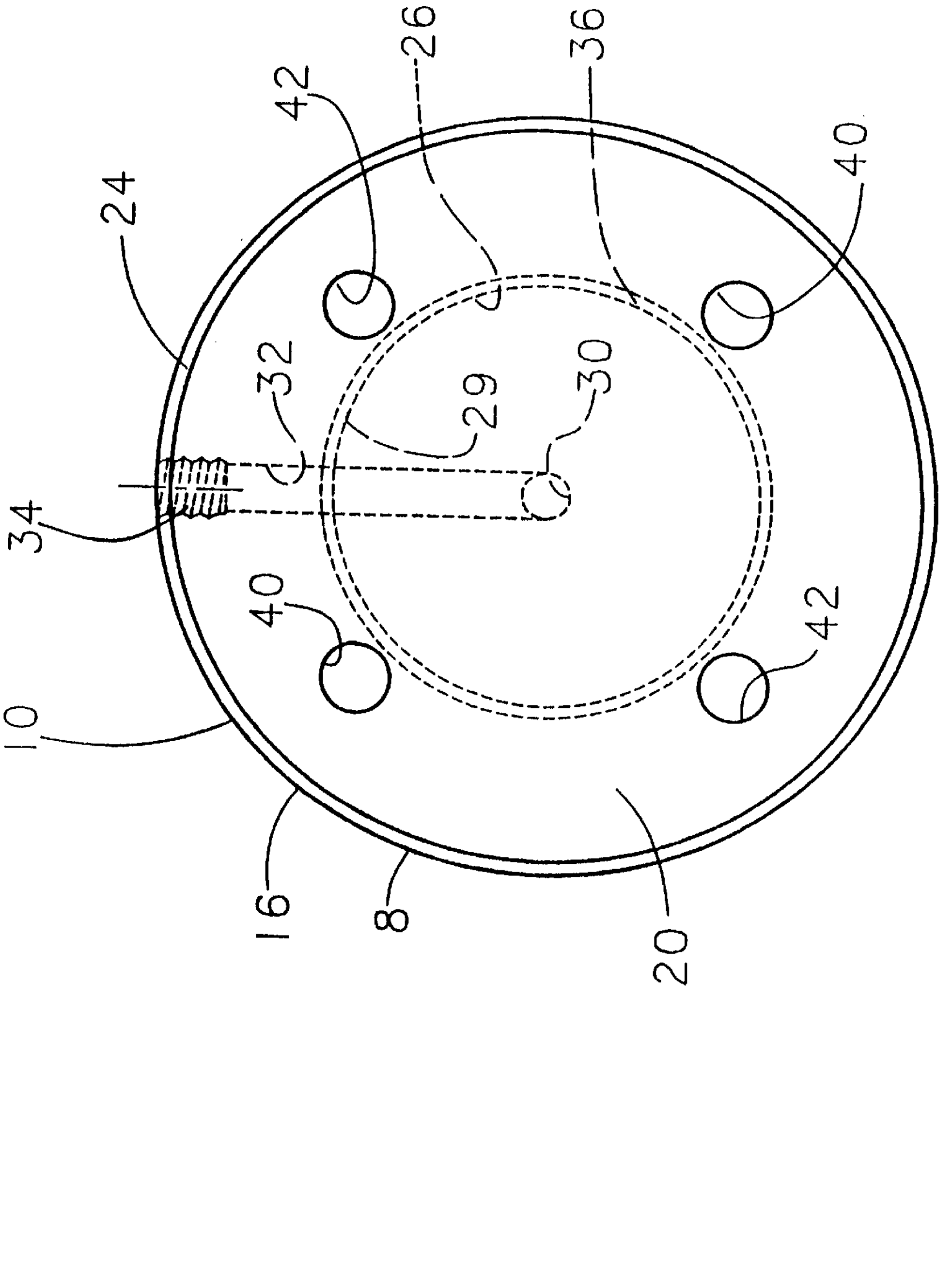
FIG. 4 is an end elevational view of a closed end of the housing and illustrates by phantom lines the passageways in the housing for for receiving grease and the plunger.
Figure 5:
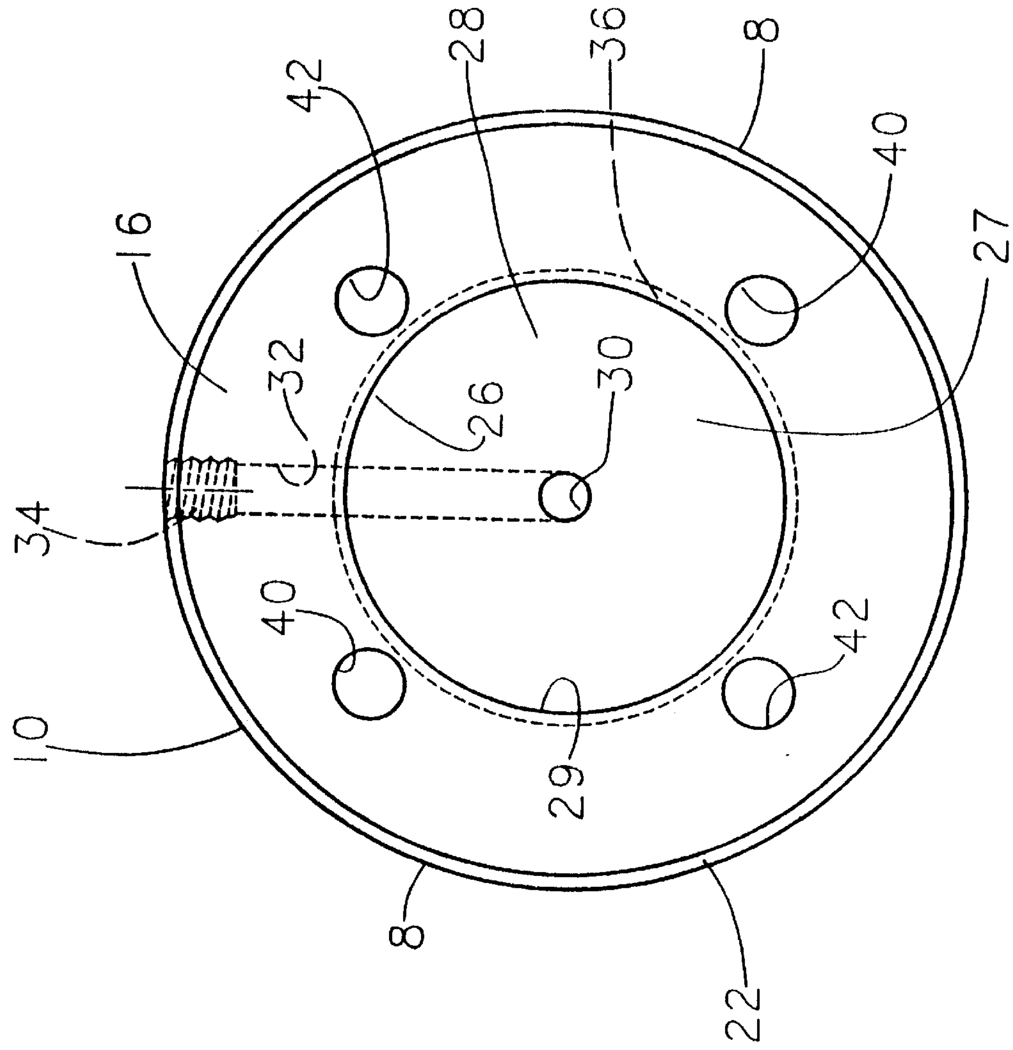
FIG. 5 is an end elevational view of the housing showing the open end of the housing and illustrates the plunger in the recess in the housing and thru passageways for attaching the housing to the yoke of the universal joint.

In FIG. 2, it is seen that there is a closed end surface 20 on the opposite end of the housing 10 from the open end surface 18.

There is a chamfer 22 between the surface 18 and the exterior surface 16.

There is a chamfer 24 between closed end surface 20 and the exterior surface 16.

In FIG. 1, it is seen that in the body of the housing 10 there is a right circular central recess 26.

In FIG. 2, it is seen, in phantom line, that there is a back wall 28 to the central recess 26.

The central recess 26 defines an opening 27.

The central recess has an inside surface 29.

Also, in FIG. 2, it is seen that there is a passageway 30 connecting with the central recess 26. The passageway 30 is an axial passageway.

There is a radial passageway 32 connecting with the axial passageway 30 and the exterior surface 16 of the housing 10. The outer end of the radial passageway 32, at the surface 16, is tapped at 34 for receiving a grease fitting.

In the central recess 26, and near the open end surface 18, there is a circular recess 36 for receiving a sealing O-ring 38. The sealing O-ring 38 is between the wall of the central recess 26 and the plunger 12.

In the figures, it is seen that there are four longitudinal passageways, two passageways 40 and two passageways 42, at right angles to each other in the body of the housing 10. These passageways 40 and 42 are positioned between the central recess 26 and the exterior surface 16. These passageways extend the length of the housing 10 and are for receiving bolts for attaching the housing 10 to the yoke of a U-joint apparatus. The passageways 40 have a larger diameter than the diameter of the passageways 42 for accomodating different size bolts.

In FIG. 1, it is seen that the plunger 12 has a generally cylindrical right angle rod configuration having an outer end 52. There is a chamfer 54 between the exterior surface 50 and the outer end 52. There is a central axial recess 56 in the outer end 52.

In FIG. 2, it is seen that the plunger 12 has an inner end 58.

There is a chamfer 60 between the inner end 58 and the exterior surface 50.

Near the inner end 58, there is a recess 62 on the exterior surface 50. There is positioned in this recess 62 an O-ring 64 for sealing purposes between the plunger 12 and the surface of the circular central recess 26.

In FIGS. 6 and 7, there is illustrated a yoke 70 having a stem 72. The yoke 70 comprises base 74 which on one side extends into an upwardly directed first arm 76 and on the other side into an upwardly directed second arm 78. The two arms 76 and 78 are spaced apart.

The two arms 76 and 78 in conjunction with the base 74 present a "U- configuration."

The first arm 76 on its outer end has a first connecting end 80.

The second arm 78 on its outer end has a second connecting end 82.

In the first end 80, there is a first passageway 84.

Also, on the outer part of the first end 80, there are two spaced-apart tapped recesses 86, see FIG. 7.

Two bolts 88 extend through the passageways 40 or through the passageways 42, whichever is appropriate, in the housing 10 and are screwed into the spaced-apart tapped recesses 86 so as to loosely position the housing onto the first connecting end 80.

Screwed into the tapped end 34 of the passageway 32 is a grease fitting 94. There is schematically illustrated a grease gun 96 connecting with the grease fitting 94. The grease gun 96 will be a manually operated grease gun or a machine-operated grease gun such as a pneumatic grease gun, see FIG. 6.

The housing 10 is definitely positioned onto the first connecting end 80. The plunger 12 is aligned with the first passageway 84. The plunger 12 is of a smaller external diameter than the internal diameter of the first passageway 84 so that the plunger 12 can slide into and move in the first passageway 84.

There is a grease cup 98 positioned in the first passageway 84.

This grease cup 98 was for receiving one member of a cross which fits with the yoke 70. It can be assumed that the cross was broken or damaged and it is necessary to replace the cross. The grease cup 98 may be firmly positioned in the first passageway 84 by corrosion between the grease cup 98 and the first passageway 84 or by chemical bonding between the cup 98 in the passageway 84. With this firm position of the grease cup 98 and the passageway 84, it is difficult to move the grease cup 98 out of the passageway 84. A person can take a hammer and a rod and beat on the grease cup, but this may take considerable time and is expensive.

With the housing 10 definitely positioned on the first connecting end 80 by means of the two bolts 88 in the tapped recesses 86, the plunger 12 can move into the first passageway 84. Grease 100 can be applied to the grease fitting 94 and the grease 100 will flow through the tapped end 34, the radial passageway 32, the axial passageway 30 and into the circular central recess 26 between the back wall 28 and the inner end 58 of the plunger 12. With the buildup of the grease 100 in the circular central recess 26, pressure is applied to the plunger 12 so as to force the plunger 12 away from the back wall 28. The outer end 52 of the plunger contacts the grease cup 98. With sufficient grease pressure in the circular recess 26, the plunger 12 is forced away from the back wall 28 of the circular central recess and contacts the grease cup 98 to force the grease cup 98 out of the first passageway 84. This allows a new cross and grease cup to be positioned in the first passageway 84.

The grease 100 has a high viscosity, and under pressure, flows like a fluid.

In the second connecting end 82, there is a second passageway 90 for receiving a grease cup (not illustrated). Also, there are two spaced-apart tapped recesses 92 for receiving bolts for holding a housing onto the second connecting end 82.

The circumstances determine if there be a grease cup in both the first passageway 84 and the second passageway 90. If there be only grease cup 98 in the first passageway 84, then only one grease cup has to be removed. If there be a grease cup in the second passageway 90, then a second grease cup 98 has to be removed.

The yoke 70 may be manufactured with the tapped recesses 86 and 92. If necessary, tapped recesses can be made in the ends 80 and 82.

The housing 10 is definitely positioned on the connecting end 80 and/or 82. There is some play between the housing 10 and the end 80 so that the plunger 12 can feel its way into the passageway 84. With this arrangement, the plunger does not bind in the passageway 84 as it moves into the passageway and through the passageway.

With the foregoing apparatus comprising the housing 10 and the plunger 12, I have manually removed grease cups 98 from a yoke 70. Instead of having to pound on the grease cup 98 with a rod and a hammer, I have been able to use a manual grease gun and remove the grease cup in 5- a short period of time. It is recommended that a good quality manual-grease gun 96 be used to remove the grease cup 98.

Again, a machine-type grease gun can be used for exerting pressure on the movable plunger 12 to force a grease cup 98 out of a first passageway 84 in a yoke 70. A machine-type grease gun may be a pneumatic grease gun.

Actually, the external diameter of the plunger 12 is less than the internal diameter of the central recess 26 in the housing 10. This has to be in order for the plunger 12 to move axially in the central recess 26.

Also, the external diameter of the plunger 12 is less than the internal diameter of the first passageway 84 in the yoke 70 so that the plunger 12 can move axially in the first passageway 84.

RESUME

This invention is directed to a pusher tool 8 for moving a member, which may be frozen or stuck in a passageway, out of the passageway. One of the uses for this invention is for pushing a grease cup out of a passageway of a yoke associated with a universal joint.

There is a housing 10 having an internal axial central recess 26.

There are passageways 30, 32, and 34 connecting with this central recess 26. The passageway 30 is an axial passageway. The passageways 32 and 34 are radial passageways. The passageway 34 is a tapped end of the passageway 32.

There is plunger 12 of less external diameter from the internal diameter of the central recess 26. The plunger 12 moves axially in the central recess 26. A grease gun 96 may be connected to the tapped end 34 of the passageway 32. The grease gun 96 may be a manual actuated grease gun or a pneumatic actuated grease gun.

The universal joint comprises a yoke 70 having two spaced-apart arms 76 and 78. The arms have ends 80 and 82. In the end 80 there is a passageway 84. In the end 82 there is a passageway 90. In the first passageway 84, there is a grease cup 98. The grease cup 98 may be frozen or stuck in the first passageway 84. It may be very difficult or impossible by manual means such as a hammer and a rod to remove the grease cup 98 from the first passageway 84.

The housing 10 is attached to the first connecting end 80. The housing 10 may be attached by means of bolts passing through passageways 40 or 42 in the housing 10 and screwed into tapped recesses 86 in the first end 80. Then, the grease can be applied to the grease fitting 96. This grease 100, under high pressure, forces the plunger 12 away from the back wall 28 of the circular central recess 26 and into contact with the end of the grease cup in the first passageway 84. The pressure created is so great that the grease cup 98 is forced out of the first passageway 84. In other words, the bond between the grease cup 98 and the first passageway 84 is broken so that the grease cup 98 moves out of the first passageway 84. The grease 100 has a high viscosity and under pressure flows like a fluid.

Actually, the external diameter of the plunger 12 is less than the internal diameter of the first passageway 84 so that the plunger 12 can move in the first passageway 84 to force the grease cup 98 out of the first passageway 84. Further, the external diameter of the plunger 12 is less than the internal diameter of the central recess 26 so that the plunger 12 can move axially in the central recess 26.

The housing 10 is loosely positioned on the connecting end 80 and/or 82. There is some play between the housing 10 and the end 80 so that the plunger 12 can feel its way into the passageway 84 and not bind in the passageway.

Some of the appropriate statutes relating to a patent application in a patent are:

35 USC 101. Inventions patentable

"Whoever invents or discovers any new and useful process, machine, manufacture, or composition of matter, or any new and useful improvement thereof, may obtain a patent therefor, subject to the conditions and requirements of this title."

35 USC 102. Conditions for patentability; novelty and loss of right to patent

"A person shall be entitled to a patent unless

"(a) the invention was known or used by others in this country, or patented or described in a printed publication in this or a foreign country, before the invention thereof by the applicant for patent, or "(b) the invention was patented or described in a printed publication in this or a foreign country or in public use or on sale in this country, more than one year prior to the date of the application for patent in the United States, or "(c) he has abandoned the invention, or "(d) the invention was first patented, or was the subject of an inventor's certificate, by the applicant or his legal representatives or assigns in a foreign country prior to the date of the application for patent in this country on an application for patent or inventor's certificate filed more than twelve months before the filing of the application in the United States, or "(e) the invention was described in a patent granted on an application for patent by another filed in the United States before the invention thereof by the applicant for patent, or on an international application by another who has fulfilled the requirements of paragraphs (1), (2), and (4) of section 371(c) of this title before the invention thereof by the applicant for patent, or (f) he did not himself invent the subject matter sought to be patented, or "(g) before the applicant's invention thereof the invention was made in this country by another who had not abandoned, suppressed, or concealed it. In determining priority of invention there shall be considered not only the respective dates of conception and reduction to practice of the invention, but also the reasonable diligence of one who was first to conceive and last to reduce to practice, from a time prior to conception by the other."

35 USC 103. Conditions for patentability; non-obvious subject matter

"A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains.

"Patentability shall not be negatived by the manner in which the invention was made. Subject matter developed by another person, which qualifies as prior art only under subsection (f) or (g) of section 102 of this title, shall not preclude patentability under this section where the subject matter and the claimed invention were, at the time of the invention was made, owned by the same person or subject to an obligation of assignment to the same person."

35 USC 112. Specification

"The specification shall contain a written description of the invention, and of the manner and process of making and using it, in such full, clear, concise, and exact terms as to enable any person skilled in the art to which it pertains, or with which it is most nearly connected, to make and use the same, and shall set forth the best mode contemplated by the inventor of carrying out his invention.

"The specification shall conclude with one or more claims particularly pointing out and distinctly claiming the subject matter which the applicant regards as his invention.

"A claim may be written in independent or, if the nature of the case admits, in dependent or multiple dependent form.

"Subject to the following paragraph, a claim in dependent form shall contain a reference to a claim previously set forth and then specify a further limitation of the subject matter claimed. A claim in dependent form shall be construed to incorporate by reference all the limitations of the claim to which it refers.

"A claim in multiple dependent form shall contain a reference, in the alternative only, to more than one claim previously set forth and then specify a further limitation of the subject matter claimed. A multiple dependent claim shall not serve as a basis for any other multiple dependent claim. A multiple dependent claim shall be construed to incorporate by reference all the limitations of the particular claim in relation to which it is being considered.

"An element in a claim for a combination may be expressed as a means or step for performing a specified function without the recital of structure, material, or acts in support thereof, and such claim shall be construed to cover the corresponding structure, material, or acts described in the specification and equivalents thereof."

A patent search was not made prior to preparing and filing this patent application.

The applicant has three co-pending design patent applications:

| Ser. No. | Patent Filing Date | Title |
|---|---|---|
| 29/001,280 | November 9, 1993 | "A U-Joint Pusher Tool" |
| 29/001,281 | November 9,1993 | "A Plunger" |
| 29/001,283 | November 10, 1993 | "A Housing" |

There is a Photograph 1 showing in a perspective view the housing 10 and the plunger 12.

Photograph 2 is a side elevational view showing a yoke and the pusher tool mounted on the yoke.

Photograph 3 is planned view showing the yoke and the pusher tool mounted on the yoke.

Photograph 4 is an end elevational view showing the yoke and the pusher tool mounted on the yoke.

SUMMARY

A summary of the invention is presented in the following.

A pusher tool comprising: a housing; a first recess in said housing and defining an opening in said housing and an open end in said housing; a plunger; said first recess having a larger internal dimension than the external dimension of said plunger to allow said plunger to be positioned in said first recess and to move in said first recess; said first recess having a first means to limit the movement of said plunger in said first recess; a first passageway in said housing to allow the introduction of a fluid between said plunger and said first means to move said plunger outwardly in said first recess; said first recess having an inside surface; said plunger having an outside surface; a first sealing means between said inside surface and said outside surface to restrict the flow of said fluid around said plunger; a first attaching means for attaching said housing to an article having a first member for contact with said plunger; a second attaching means for receiving a second member for introducing said fluid to said first passageway; said first sealing means comprising a second recess in the inside surface of said first recess and a first O-ring in said second recess; said second recess being near said open end of said housing; a third recess in the outside surface of said plunger; a second O-ring in said third recess for, in conjunction with said first O-ring in said second recess, restricts the flow of said fluid between said plunger and the inside surface of said first recess and out of said first opening; said plunger having an inner end which is positioned in said first recess; said third recess being near said inner end of said plunger; said second attaching means comprising a tapped opening for receiving a grease fitting and for connecting with said first passageway; and, said first attaching means comprising a second passageway in said housing.

A process for making a pusher tool for pushing a member out of a first passageway, said process comprising: forming a housing with a first recess and defining a first opening; forming a plunger; forming said first recess to have a larger internal dimension than the external dimension of said plunger for allowing said plunger to be positioned in said first recess and for allowing said plunger to move in said first recess; forming said first recess to have a first means to limit the movement of said plunger in said first recess; forming a first passageway in said housing to allow the introduction of a fluid between said plunger and said first means to move said plunger outwardly in said first recess; forming said first recess to have an inside surface; forming said plunger to have an outside surface; forming a second recess in said inside surface of said first recess; positioning a first O-ring in said second recess; forming a third recess in the outside surface of said plunger; positioning a second O-ring in said third recess; said first O-ring and said second O-ring restricting the flow of said fluid between said plunger and the inside surface of said first recess and out of said first opening; forming said plunger with an inner end; forming said third recess near said inner end of said plunger; forming said second recess near said first opening of said housing; tapping said first passageway for the acceptance of a grease fitting; and, forming said housing with a second passageway.

A pusher tool for pushing a member out of a first passageway and made by a process comprising: forming a housing with a first recess and defining a first opening for said first recess; forming a plunger; forming said first recess to have a larger internal dimension than the external dimension of said plunger for allowing said plunger to be positioned in said recess and to move in said first recess; forming said first recess to have a first means to limit the movement of said plunger in said first recess; forming a first passageway in said housing to allow the introduction of a fluid between said plunger and said first means to move said plunger outwardly in said first recess; forming said first recess to have an inside surface; forming said plunger to have an outside surface; forming a second recess in said inside surface of said first recess; positioning a first O-ring in said second recess; forming a third recess in the outside surface of said plunger; positioning a second 0-ring in said third recess; said first O-ring and said second O-ring restricting the flow of said fluid between said plunger and the inside surface of said first recess and out of said first opening; forming said plunger with an inner end; forming said third recess near said inner end of said plunger; forming said second recess near said first opening of said housing; tapping said first passageway for the acceptance of a grease fitting; and forming said housing with a second passageway.

A combination of a mechanical unit and a pusher tool, said combination comprising: a combination of a mechanical unit having a first passageway and a removable device in said first passageway; said pusher tool comprising: a housing; a first recess in said housing and defining an opening in said housing and an open end in said housing; a plunger; said first recess having a larger internal dimension than the external dimension of said plunger to allow said plunger to be positioned in said first recess and to move in said first recess; said first recess having a first means to limit the movement of said plunger in said first recess; a second passageway in said housing to allow the introduction of a fluid between said plunger and said first means to move said plunger outwardly in said first recess; the interior dimension of said first passageway being greater than the external dimension of said plunger to allow said plunger to move in said first passageway; a first attaching means to firmly position together said mechanical unit and said pusher tool; said first recess having an inside surface; said plunger having an outside surface; a first sealing means between said inside surface and said outside surface to restrict the flow of said fluid around said plunger; a second attaching means for receiving a second member for introducing said fluid to said second passageway; said first sealing means comprising a second recess in said inside surface of said first recess and a first 0-ring in said second recess; said second recess being near said open end of said housing; a third recess in the outside surface of said plunger; a second O-ring in said third recess; said plunger having an inner end which is positioned in said first recess; said third recess being near said inner end of said plunger; said second attaching means comprising a tapped opening for receiving a grease fitting and for connecting with said second passageway; said second attaching means comprising a second passageway in said housing; said mechanical unit being a yoke of a universal joint; said yoke having an arm; said arm having said first passageway and said removable device in said first passageway; a tapped recess in said arm; a threaded bolt in said second passageway and in said tapped recess in said arm to position together said housing onto said yoke; and said housing and said yoke being loosely positioned together so that said plunger can feel its way in said first passageway and not bind in said first passageway.

A process for moving a member in a first passageway in a mechanical unit and which process comprises: forming a housing with a first recess and defining a first opening; forming a plunger; forming said first recess to have a larger internal dimension than the external dimension of said plunger for allowing said plunger to be positioned in said first recess and for allowing said plunger to move in said first recess; forming said first recess to have a first means to limit the movement of said plunger in said first recess; forming a second passageway in said housing to allow the introduction of a fluid between said plunger and said first means to move said plunger outwardly in said first recess; forming said plunger to have a smaller external dimension than the internal dimension of said first passageway for allowing said plunger to be positioned in said first passageway and for allowing said plunger to move in said first passageway; operatively uniting said mechanical unit and said pusher tool; moving said plunger in said first passageway to contact said member and to move said member in said first passageway; forming said first recess to have an inside surface; forming said plunger to have an outside surface; forming a second recess in said inside surface of said first recess; positioning a first O-ring in said second recess; forming a third recess in the outside surface of said plunger; positioning a second O-ring in said third recess; said first O-ring and said second O-ring restricting the flow of said fluid between said plunger and the inside surface of said first means and out of said first opening; forcing said fluid into said second passageway in said housing to move said plunger outwardly in said first recess and into said first passageway in said mechanical unit to move said member in said first passageway; said mechanical unit being a yoke of a universal joint; said yoke having an arm; said arm having said first passageway and said removable device in said first passageway; a tapped recess in said arm; forming a third passageway in said housing; and, positioning a threaded bolt in said third passageway and in said tapped recess to operatively unite said pusher tool and said mechanical unit; operatively uniting loosely said pusher tool and said mechanical unit so that said plunger can feel its way in said first passageway and not bind in said first passageway.

A member in a first passageway in a mechanical unit moved by a process comprising: forming a housing with a first recess and defining a first opening; forming a plunger; forming said first recess to have a larger internal dimension than the external dimension of said plunger for allowing said plunger to be positioned in said first recess and for allowing said plunger to move in said first recess; forming said first recess to have a first means to limit the movement of said plunger in said first recess; forming a second passageway in said housing to allow the introduction of a fluid between said plunger and said first means to move said plunger outwardly in said first recess; forming said plunger to have a smaller external dimension than the internal dimension of said first passageway for allowing said plunger to be positioned in said first passageway and for allowing said plunger to move in said first passageway; uniting said mechanical unit and said pusher tool; moving said plunger in said first passageway to contact said member and to move said member in said first passageway; forming said first recess to have an inside surface; forming said plunger to have an outside surface; forming a second recess in said inside surface of said first recess; positioning a first O-ring in said second recess; forming a third recess in the outside surface of said plunger; positioning a second O-ring in said third recess; said first O-ring and said second O-ring restricting the flow of said fluid between said plunger and the inside surface of said first means and out of said first opening; forcing said fluid into said first passageway in said housing to move said plunger outwardly in said first recess and into said first passageway in said mechanical unit to move said member in said first passageway; said mechanical unit being a yoke of a universal joint; said yoke having an arm; said arm having said first passageway and said removable device in said first passageway; a tapped recess in said arm; and, forming a third passageway in said housing; positioning a threaded bolt in said third passageway and in said tapped recess to operatively unite said pusher tool and said mechanical unit; and, operatively uniting loosely said pusher tool and said mechanical unit so that said plunger can feel its way in said first passageway and not bind in said first passageway.

What I claim is:

1. A pusher tool for physically contacting a grease cup and for moving said grease cup in a first passageway in a yoke and comprising:

a. a housing;

b. a first recess in said housing and defining an opening in said housing and a first open end in said housing;

c. a plunger;

d. said first recess having a larger internal dimension than the external dimension of said plunger to allow said plunger to be positioned in said first recess and to move in said first recess;

e. said first recess having a first means to limit the movement of said plunger in said first recess; and f. a second passageway in said housing to allow the introduction of a fluid between said plunger and said first means to move said plunger outwardly in said first recess;

g. said first passageway in said yoke having a larger interior dimension than the external dimension of said plunger to allow said plunger to move in said first passageway and to physically contact said grease cup in said yoke to move said grease cup in said first passageway; and h. connecting means comprising an axial third passageway in said pusher tool to assist in connecting said pusher tool to said yoke to assist the pusher tool in physically contacting said grease cup and in moving said grease cup in said first passageway.

2. A pusher tool according to claim 1 and comprising:

a. said first recess having an inside surface;

b. said plunger having an outside surface; and, c. a first sealing means between said inside surface and said outside surface to restrict the flow of said fluid around said plunger.

3. A pusher tool according to claim 2 and comprising:

a. a first attaching means as part of said connecting means for attaching said housing to said yoke having said grease cup for contact with said plunger; and b. a second attaching means for receiving a second member for introducing said fluid to said first recess.

4. A pusher tool according to claim 3 and comprising:

a. said first sealing means comprising a second recess in the inside surface of said first recess and a first O-ring in said second recess;

b. said second recess being near said open end of said housing;

c. a third recess in the outside surface of said plunger;

d. a second O-ring in said third recess for, in conjunction with said first O-ring in said second recess, to restrict the flow of said fluid between said plunger and the inside surface of said first recess and to restrict the flow of fluid out of said first open end;

e. said plunger having an inner end which is positioned in said first recess;

f. said third recess being near said inner end of said plunger; and g. said second attaching means comprising a tapped opening for receiving a grease fitting and for connecting with said first passageway.

5. A process for making a pusher tool for moving a grease cup in a first passageway in a yoke, said process comprising:

a. forming a housing with a first recess and defining a first opening;

b. forming a plunger;

c. forming said first recess to have a larger internal dimension than the external dimension of said plunger for allowing said plunger to be positioned in said first recess and for allowing said plunger to move in said first recess;

d. forming said first recess to have a first means to limit the movement of said plunger in said first recess;

e. forming a second passageway in said housing to allow the introduction of a fluid between said plunger and said first means to move said plunger outwardly in said first recess;

f. forming said plunger to have an external dimension smaller than the internal dimension of said first passageway in said yoke to allow said plunger to move in said first passageway in said yoke to move said grease cup in said first passageway in said yoke; and g. forming connecting means comprising an axial third passageway in said pusher tool to assist in connecting said pusher tool to said yoke to assist the pusher tool in moving said grease cup in said first passageway.

6. A process according to claim 5 and comprising:

a. forming said first recess to have an inside surface;

b. forming said plunger to have an outside surface;

C. forming a second recess in said inside surface of said first recess;

d. positioning a first O-ring in said second recess;

e. forming a third recess in the outside surface of said plunger;

f. positioning a second O-ring in said third recess; and, g. said first O-ring and said second O-ring restricting the flow of said fluid between said plunger and the inside surface of said first recess and out of said first opening.

7. A process according to claim 6 and comprising:

a. forming said plunger with an inner end and positioning said plunger in said first recess and with said inner end away from said first opening;

b. forming said third recess near said inner end of said plunger;

c. forming said second recess near said first opening of said housing; and d. tapping said second passageway for the acceptance of a grease fitting.

8. A pusher tool for moving a grease cup in a first passageway in a yoke and made by a process comprising:

a. forming a housing with a first recess and defining a first opening for said first recess;

b. forming a plunger;

c. forming said first recess to have a larger internal dimension than the external dimension of said plunger for allowing said plunger to be positioned in said recess and to move in said first recess;

d. forming said first recess to have a first means to limit the movement of said plunger in said first recess;

e. forming a second passageway in said housing to allow the introduction of a fluid between said plunger and said first means to move said plunger outwardly in said first recess;

f. forming said plunger to have an external dimension smaller than the internal dimension of said first passageway in said yoke to allow said plunger to move in said first passageway in said yoke to move said grease cup in said first passageway in said yoke; and g. forming connecting means comprising an axial third passageway in said pusher tool to assist in connecting said pusher tool to said yoke to assist the pusher tool in moving said grease cup in said first passageway.

9. A pusher tool made by a process according to claim 8 and comprising:

a. forming said first recess to have an inside surface;

b. forming said plunger to have an outside surface;

c. forming a second recess in said inside surface of said first recess;

d. positioning a first O-ring in said second recess;

e. forming a third recess in the outside surface of said plunger;

f. positioning a second O-ring in said third recess; and g. said first O-ring and said second O-ring restrict the flow of said fluid between said plunger and the inside surface of said first recess and out of said first opening.

10. A pusher tool made by a process according to claim 9 and comprising:

a. forming said plunger with an inner end and positioning said plunger in said first recess and with said inner end away from said first opening;

b. forming said third recess near said inner end of said plunger;

c. forming said second recess near said first opening of said housing; and d. tapping said second passageway for the acceptance of a grease fitting.

11. A combination of a yoke of a universal joint and a pusher tool for physically contacting said yoke and for moving a grease cup in said yoke, said combination comprising:

I. a combination of said yoke having a first passageway and said grease cup in said first passageway;

II. said pusher tool comprising:

a. a housing;

b. a first recess in said housing and defining an opening in said housing and an open end in said housing;

c. a plunger;

d. said first recess having a larger internal dimension than the external dimension of said plunger to allow said plunger to be positioned in said first recess and to move in said first recess;

e. said first recess having a first means to limit the movement of said plunger in said first recess;

f. a second passageway in said housing to allow the introduction of a fluid between said plunger and said first means to move said plunger outwardly in said first recess;

g. the interior dimension of said first passageway being greater than the external dimension of said plunger to allow said plunger to move in said first passageway;

h. connecting means comprising an axial third passageway in said pusher tool to assist in connecting said pusher tool to said yoke to assist the pusher tool in moving said grease cup in said first passageway in said yoke; and i. a first attaching means in said axial third passageway to firmly position together said yoke of said universal joint and said pusher tool.

12. A combination of a yoke of a universal joint and a pusher tool according to claim 11, said combination comprising:

a. said first recess having an inside surface;

b. said plunger having an outside surface; and, c. a first sealing means between said inside surface and said outside surface to restrict the flow of said fluid around said plunger.

13. A combination of a yoke of a universal joint and a pusher tool according to claim 12, said combination comprising:

a. a second attaching means for receiving a second member for introducing said fluid to said second passageway.

14. A combination of a yoke of a universal joint and a pusher tool according to claim 13, said combination comprising:

a. said first sealing means comprising a second recess in said inside surface of said first recess and a first O-ring in said second recess;

b. said second recess being near said open end of said housing;

c. a third recess in the outside surface of said plunger;

d. a second O-ring in said third recess for, in conjunction with, said first O-ring in said second recess to restrict the flow of said fluid between said plunger and the inside surface of said first recess and to restrict the flow of fluid out of said first open end;

e. said plunger having an inner end which is positioned in said first recess;

f. said third recess being near said inner end of said plunger;

g. said second attaching means comprising a tapped opening for receiving a grease fitting and for connecting with said second passageway;

h. said second attaching means comprising a second passageway in said housing;

i. an axial third passageway in said housing to assist in attaching said housing to said yoke;

j. said yoke having an arm;

k. said arm having said first passageway and said grease cup in said first passageway;

l. a tapped recess in said arm; and, m. a threaded bolt in said axial third passageway and in said tapped recess in said arm to firmly position together said housing onto said yoke.

15. A process for moving a grease cup in a first passageway in a yoke of a universal joint and which process comprises:

a. forming a housing with a first recess and defining a first opening;

b. forming a plunger;

c. forming said first recess to have a larger internal dimension than the external dimension of said plunger for allowing said plunger to be positioned in said first recess and for allowing said plunger to move in said first recess;

d. forming said first recess to have a first means to limit the movement of said plunger in said first recess;

e. forming a second passageway in said housing to allow the introduction of a fluid between said plunger and said first means to move said plunger outwardly in said first recess.

f. forming said plunger to have an external dimension smaller than the internal dimension of said first passageway in said yoke to allow said plunger to move in said first passageway to move said grease cup in said first passageway in said yoke;

g. operatively uniting said yoke of a universal joint and said pusher tool;

h. forming connecting means comprising an axial third passageway in said pusher tool to assist in connecting said pusher tool to said yoke to assist the pusher tool in moving said grease cup in said first passageway: and i. moving said plunger in said first passageway to contact said grease cup and to move said grease cup in said first passageway.

16. A process according to claim 15 and comprising:

a. forming said first recess to have an inside surface;

b. forming said plunger to have an outside surface;

c. forming a second recess in said inside surface of said first recess;

d. positioning a first O-ring in said second recess;

e. forming a third recess in the outside surface of said plunger;

f. positioning a second O-ring in said third recess;

g. said first O-ring and said second O-ring restrict the flow of said fluid between said plunger and the inside surface of said first means and out of said first opening; and h. forcing said fluid into said second passageway in said housing to move said plunger outwardly in said first recess and into said first passageway in said yoke of a universal joint to move said grease cup in said first passageway.

17. A process according to claim 16 and comprising:

a. said yoke having an arm;

b. said arm having said first passageway and said grease cup in said first passageway;

c. a tapped recess in said arm;

d. forming an axial third passageway in said housing; and e. positioning a threaded bolt in said third passageway and in said tapped recess to operatively unite said pusher tool and said yoke of said universal joint; and f. operatively uniting loosely said pusher tool and said yoke of a universal joint so that said plunger can move and feel its way in said first passageway to move said grease cup and not bind in said first passageway.

18. A grease cup in a first passageway in a yoke of a universal joint and moved by a process comprising:

a. forming a housing with a first recess and defining a first opening;

b. forming a plunger;

c. forming said first recess to have a larger internal dimension than the external dimension of said plunger for allowing said plunger to be positioned in said first recess and for allowing said plunger to move in said first recess;

d. forming said first recess to have a first means to limit the movement of said plunger in said first recess;

e. forming a second passageway in said housing to allow the introduction of a fluid between said plunger and said first means to move said plunger outwardly in said first recess;

f. forming said plunger to have a smaller external dimension than the internal dimension of said first passageway for allowing said plunger to be positioned in said first passageway and for allowing said plunger to move in said first passageway;

g. uniting said yoke of a universal joint and said pusher tool;

h. moving said plunger in said first passageway to physically contact said grease cup and to move said grease cup in said first passageway and i. forming connecting means comprising an axial third passageway in said pusher tool to assist in connecting said pusher tool to said yoke to assist the pusher tool in physically contacting said grease cup and in moving said grease cup in said first passageway.

19. A grease cup in a first passageway moved by a process according to claim 18 and comprising:

a. forming said first recess to have an inside surface;

b. forming said plunger to have an outside surface;

c. forming a second recess in said inside surface of said first recess;

d. positioning a first O-ring in said second recess;

e. forming a third recess in the outside surface of said plunger;

f. positioning a second O-ring in said third recess;

g. said first O-ring and said second O-ring restricting the flow of said fluid between said plunger and the inside surface of said first means and out of said first opening; and h. forcing said fluid into said first passageway in said housing to move said plunger outwardly in said first recess and into said first passageway in said yoke of a universal joint to move said grease cup in said first passageway.

20. A grease cup in a first passageway moved by a process according to claim 18 and comprising:

a. said yoke having an arm;

b. said arm having said first passageway and said grease cup in said first passageway;

c. a tapped recess in said arm;

d. forming a third passageway in said housing; and e. positioning a threaded bolt in said third passageway and in said tapped recess to operatively unite said pusher tool and said yoke of said universal joint; and f. operatively uniting loosely said pusher tool and said yoke of a universal joint so that said plunger can move and feel its way f. in said first passageway to contact and to move said grease cup and not bind in said first passageway.

* * * * *